F. M. & W. F. PENNEBAKER.
DUMPING-WAGON.

No. 182,955. Patented Oct. 3, 1876.

WITNESSES:
H. Rydquist.
John Goethals

INVENTOR:
F. M. Pennebaker
W. F. Pennebaker
BY
ATTORNEYS.

UNITED STATES PATENT OFFICE.

FRANCIS M. PENNEBAKER AND WILLIAM F. PENNEBAKER, OF PLEASANT HILL, KENTUCKY.

IMPROVEMENT IN DUMPING-WAGONS.

Specification forming part of Letters Patent No. 182,955, dated October 3, 1876; application filed June 26, 1876.

*To all whom it may concern:*

Be it known that we, F. M. PENNEBAKER and W. F. PENNEBAKER, of Pleasant-Hill, in the county of Mercer and State of Kentucky, have invented a new and Improved Dumping-Wagon, of which the following is a specification:

Our invention consists of the combination, with the box contrived to slide back on the wagon-bed and tilt down behind for dumping, of a windlass under the driver's seat, and cords so connected with the box that it can be run out and allowed to dump, and drawn back, all by the same windlass on which the cords wind, so as not to obstruct or act against each other by reason of the necessary variations in the paying out and winding up of the cords.

Figure 1:
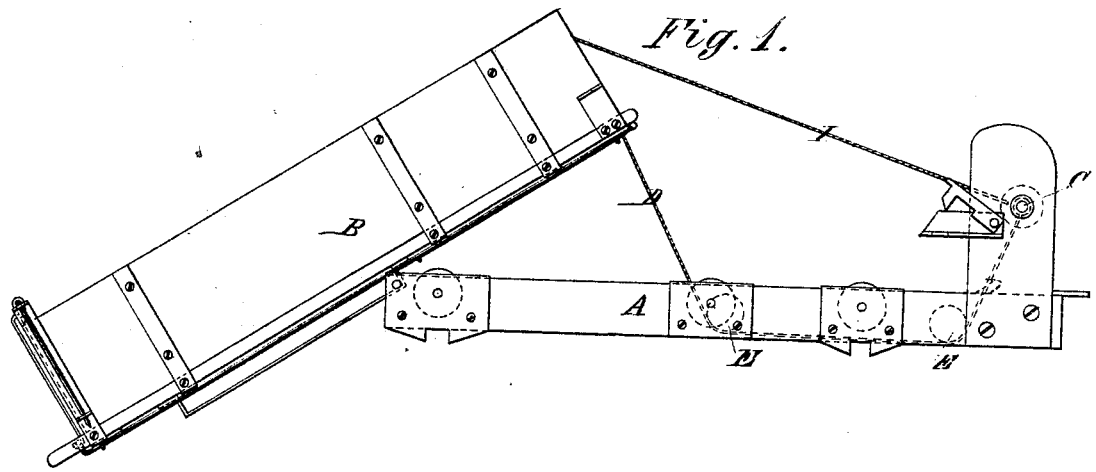
Figure 2:
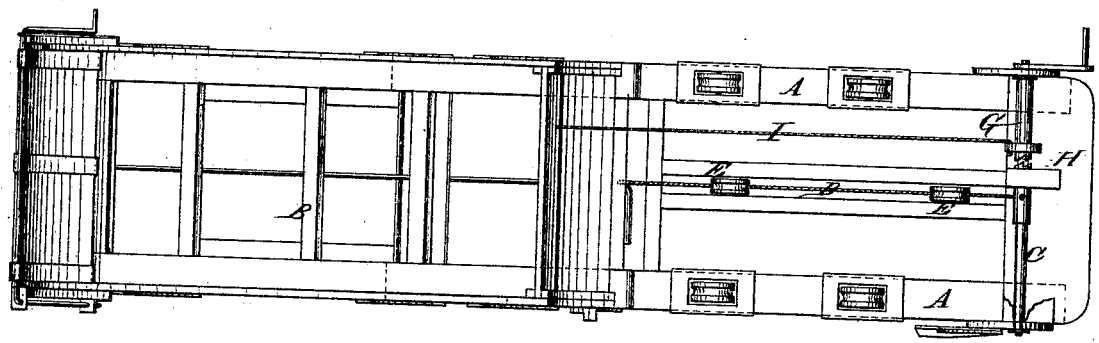
Figure 3:
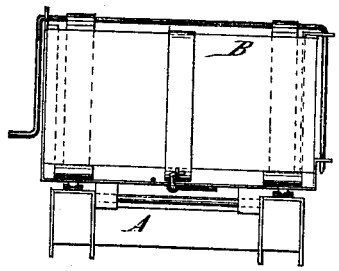

Figure 1 is a side elevation of our improved dumping-wagon, showing the body tilted up, as in dumping. Fig. 2 is a plan view, and Fig. 3 is a hind-end elevation.

A is the bed of the wagon, on which the body B is arranged to slide backward and forward for dumping out the load behind, by tilting up on the hind end of the bed, as shown in Fig. 1. C is the crank-shaft under the driver's seat, for sliding the body forward and backward. It has one cord, D, attached to it, and passing under pulleys E to the front end of the body, to which it is connected and disconnected by a clutch, H, and having a cord, I, attached to it, and connected to the front end of the body, for drawing the body back after dumping.

The operation is as follows: By turning the windlass in one direction, the clutch causes the loose sleeve to turn with the windlass, while the cord D winds up and draws the body back until it tips; the weight then unwinds cord D by revolving the sleeve backward, and the cord I has unwound. In drawing the body forward by winding up the cord I by a reverse rotation of windlass, the sleeve and cord D are not affected. Thus the body is shifted back and forth by the driver without leaving the front of wagon, and with a single windlass.

Having thus described our invention, what we claim as new, and desire to secure by Letters Patent, is—

The combination, with roller-bed A, having windlass mechanism and box B removable on said bed, of the shaft-cord D, passing under pulleys E to front of box, shaft-cord I, attached to rear of box, and the clutch device G H, all arranged substantially as and for the purpose specified.

FRANCIS M. PENNEBAKER.
WILLIAM F. PENNEBAKER.

Witnesses:
JOHN FALCON,
R. P. LATHAM.